United States Patent
Sicher et al.

(10) Patent No.: US 8,050,705 B2
(45) Date of Patent: Nov. 1, 2011

(54) SUBSCRIBER IDENTITY MODULE UNLOCKING SERVICE PORTAL

(75) Inventors: Alan E. Sicher, Austin, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 431 days.

(21) Appl. No.: 11/548,749

(22) Filed: Oct. 12, 2006

(65) Prior Publication Data

US 2008/0090614 A1    Apr. 17, 2008

(51) Int. Cl.
*H04M 1/00* (2006.01)
(52) U.S. Cl. ............... 455/550.1; 455/100; 455/407; 455/3.04; 455/425; 455/461; 455/418; 455/419; 455/420; 455/551; 370/343; 370/375; 370/379; 370/381
(58) Field of Classification Search ............... 455/550.1, 455/407, 3.04, 425, 461, 418, 419, 420, 551, 455/100; 370/343, 375, 379, 381
See application file for complete search history.

(56) References Cited

U.S. PATENT DOCUMENTS

| | | | | |
|---|---|---|---|---|
| 6,061,346 A * | 5/2000 | Nordman | ...................... | 370/352 |
| 6,178,335 B1 * | 1/2001 | Vu | ................................ | 455/558 |
| 6,321,079 B1 | 11/2001 | Cooper | ........................ | 455/411 |
| 6,871,063 B1 * | 3/2005 | Schiffer | ........................ | 455/410 |
| 2002/0123336 A1 * | 9/2002 | Kamada | ........................ | 455/420 |
| 2004/0198335 A1 * | 10/2004 | Campen | ........................ | 455/419 |
| 2004/0248566 A1 * | 12/2004 | Suzuki | ........................ | 455/418 |

OTHER PUBLICATIONS

Surfnet, Vodafone "Amuse, A Mobility trial with Umts/wlan Seamlessly, 802.1x/EAP-SIM Authentication for WLAN, User Manual" Jan. 22, 2007, http://www.surfnet.nl/innovatie/freeband/AMUSE-EAPSIM-Manual.pdf (13 pages).

* cited by examiner

*Primary Examiner* — Nimesh Patel
(74) *Attorney, Agent, or Firm* — Hamilton & Terrile, LLP; Stephen A. Terrile

(57) ABSTRACT

An improved method and system for removing operating restrictions associated with a predetermined subscriber identity module (SIM) from a wireless device. A user is allowed to securely log onto a Web site that contains support information on subscription plans, billing, termination, penalties, and device-to-SIM unlocking. After satisfying any outstanding contract terms and payment of termination or device unlock fees, the user initiates a device-to-SIM unlock procedure. A client application on the wireless device securely transfers subscription, system, and SIM information to a device-to-SIM unlock system which uses the information to generate appropriate unlock codes. The unlock codes are then securely transferred to the client application, which processes them to remove operating restrictions associated with the predetermined SIM from the device and allow it to thereafter implement a plurality of SIMs.

14 Claims, 4 Drawing Sheets

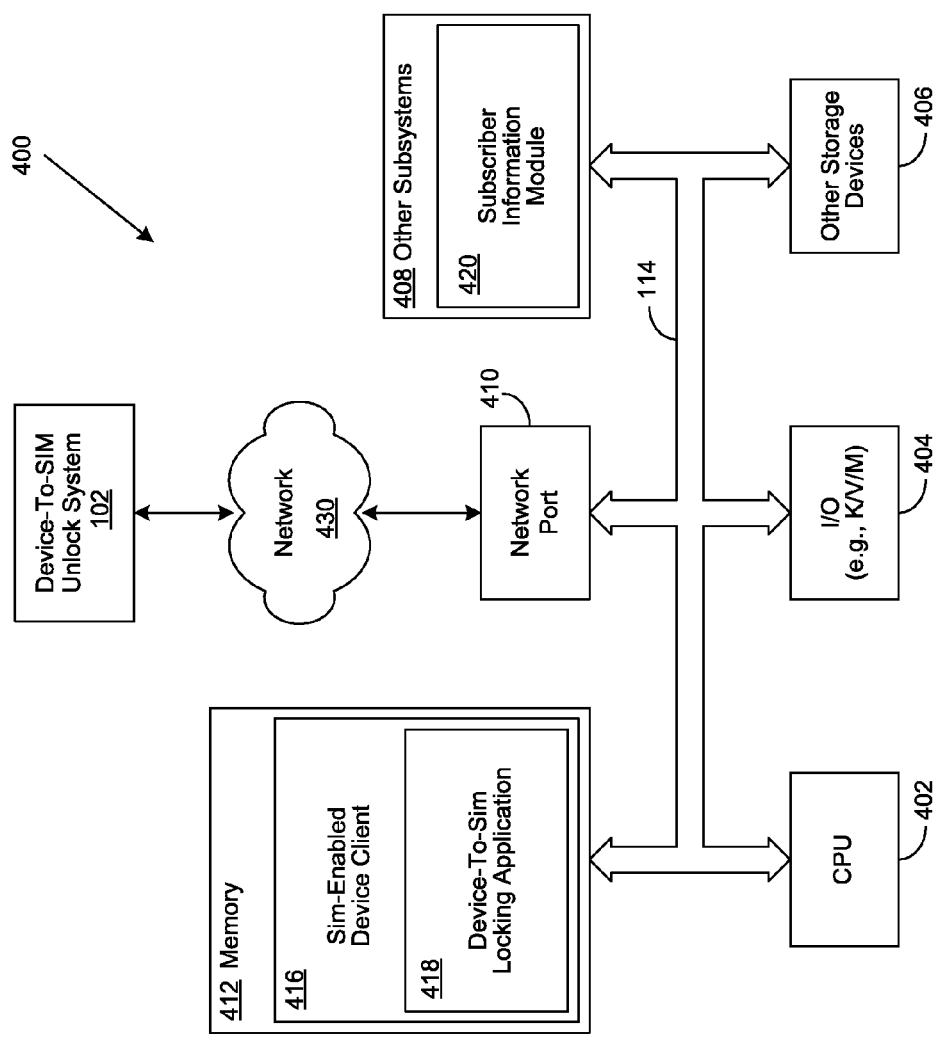

SUBSCRIBER IDENTITY MODULE UNLOCKING SERVICE PORTAL

BACKGROUND OF THE INVENTION

1. Field of the Invention

The present invention relates to the field of subscriber identity modules (SIMs), and more particularly to removing SIM-based usage restrictions from an information handling system via a service portal.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mobile wireless broadband networks such as wireless wide area networks (WWANs) are evolving to support higher data rates, reduced latency and more extensive roaming and coverage. As these networks become more capable, they become increasingly relevant to information handling system customers and thus to suppliers of notebook and personal digital assistant (PDA) type information handling systems. Known mobile wireless broadband networks exploit a separate Subscriber Identity Module (SIM), which is a chip-based, electronic identity card that resides in a wireless device and stores the user's network authentication and subscriber information. There are a plurality of different types of SIM cards, where the term SIM applies to all variations of SIM cards. One example of a SIM card is a Universal Subscriber Identity Module (USIM), which is used with wireless networks based on 3rd Generation Partnership (3GPP) and Universal Mobile Telecommunications System (UMTS) telecommunications standards. Another example is a Removable User Identity Module (R-UIM). An advantage of an R-UIM is that it can be used interchangeably with Global System for Mobile Communications (GSM) and Code Division Multiple Access 2000 (CDMA2000) wireless networks. Another example is an internet protocol (IP) multimedia SIM (iSIM) used for multimedia enhanced 3GPP networks. Each SIM is uniquely identified by its International Circuit Card ID (ICCID) which is coupled to the subscriber's International Mobile Subscriber Identity (IMSI) for identification. In addition, the SIM stores network state information such as its current Location Area Identity (LAI) to facilitate wireless connectivity and generation of call detail records for billing. As a result, the SIM is not only responsible for enabling and controlling a subscriber's access to a wireless network, but also as a unique reference for tracking their wireless usage for billing.

A SIM architecture is capable of extending the functionality of a wireless device through a specified programming application program interface (API) known as the SIM Toolkit (STK). By providing a means to read and write to the data store of the SIM, the STK enables the SIM to initiate commands to establish an interactive exchange between a network application and the user. The functionality of the STK also includes control of access to the network, communication services, application behavior, the user interface, menu management, and accessory management. In addition, the STK can be utilized to remotely change certain SIM parameters using Over-the-Air Activation (OAA) messages that have been defined for activation, provisioning and the download of roaming network lists. These OAA messages typically make use of a distinct Teleservice riding over the Short Message Service (SMS) bearer data service. It is also known for mobile phone reference platforms to provide support for application programming environments based on the Java 2 Micro Edition (J2ME) platform or the Qualcomm Binary Runtime Environment for Wireless (BREW) platform, which enable multimedia capabilities.

Originally, SIM cards were intended to be removable so as to provide device independence and subscriber account portability by providing the means to logically decouple a subscription from a device. However, wireless carriers are now increasingly insisting on programmatically locking a particular device (e.g., a cellular phone or radio card) such that they only work with the SIMs they issue. This is typically done in an attempt to protect the carrier's cost of providing wireless devices at a discount as part of a service plan and to reduce account churn. Wireless carriers typically provide devices at a discount, and then make up the difference by requiring the customer to sign a multi-year contract promising to pay monthly service or to pay a penalty for early termination. Additionally, wireless carriers are increasingly considering and developing activation portals that are referred to as "walled gardens". With a walled garden activation portal, a pre-activated SIM card is provided with a wireless device to a customer. The pre-activated card provides limited access to a secure portal where a customer can select a subscription plan (e.g. monthly, pre-paid, session, etc.), enter billing information, and then complete final card activation. The activation portal then interacts with the carrier's network infrastructure back-end to convey account provisioning instructions through the previously described APIs to the SIM.

However, information handling system manufacturers are moving to embed WWAN radios in notebook and other portable information handling systems. Thus, device-to-SIM locking becomes increasingly problematic for customers (especially large corporate or relationship customers) who often insist on carrier flexibility and choice. It is therefore desirable for information handling system manufacturers to encourage wireless carriers to drop their SIM locking requirement or to alternatively provide a simple device-to-SIM unlocking solution. One known method of unlocking a wireless device is for the subscriber to bring it to the carrier's retail store or service center. A service technician can then connect a vendor-specific serial cable to the device and use a software application which generates a master code or network code key to unlock the device. Another method is for the unlock code to be provided by the carrier by over-the-air (OTA) transmission. However, these approaches present attendant issues to information handling system manufacturers, and particularly to information handling system manufacturers that provide remotely-built-to-order information handling systems. For example, if the information handling system is remotely-supplied, the customer may be required to call customer support. If so, then customer support would need to be able to unlock the device. However, the manufacturer may not have the ability to generate a network code key or they may be unable to obtain a master code from the incumbent carrier. Furthermore, providing customers with a generic unlock code poses many practical issues.

SUMMARY OF THE INVENTION

The invention provides an improved method and system for removing operating restrictions from a wireless device corresponding to a predetermined subscriber identity module (SIM). The method includes a Web site that contains support information on subscription plans, billing, termination, penalties, and device-to-SIM unlocking. A user is allowed to securely log onto this Web site (e.g. via a username/password login using HTTPS/SSL) to settle account balances, termination penalties and any device unlock fees, including the repayment of wireless device subsidies. After satisfying any outstanding contract terms, the user selects and initiates a device-to-SIM unlock procedure.

A client application implemented on the wireless device is used to establish a connection to a device-to-SIM unlock system (unlock system). After the appropriate transport session establishment and authentication handshaking, the client application can securely transfer subscription, system, and SIM information to the unlock system. Based on the submitted information, the unlock system generates appropriate unlock codes and then securely transfers the unlock codes to the client application. The client application then receives, acknowledges, and processes the unlock codes via for example, a programmatic firmware interface. The client unlock process is then initiated to remove operating restrictions associated with the predetermined SIM from the device and allow it to thereafter implement a plurality of SIMs. Success and failed outcomes are reported back to the unlock server so that feedback can be presented to a user via the Web service portal.

In selected embodiments, the method can be initiated and completed via a wired Internet connection without requiring the use of a wireless connection. Additionally, instead of exploiting Internet-based communication protocols, mobile network centric communication protocols can be used can be used separately or in combination, including: TextMsg and OAA over the SMS Bearer Service, and the Wireless Application Protocol (WAP). The mobile-specific Java Virtual Machine (JVM) and Qualcomm BREW application environments can also be used directly rather than a more closed client programming model. In addition, other wireless technologies may utilize similar SIM-based capabilities such as WiMax (802.16e), Wi-Fi (e.g. a wireless internet service provider (WISP) using extensible authentication protocol for GSM subscriber identity (EAP-SIM)) and others.

Additionally, if a SIM-enabled device firmware flash update is necessary or useful to the unlocking process, then the device-to-SIM unlock process can first initiate this firmware update. Such a firmware update is beneficial to refresh the SIM-enabled device and thus make the process less carrier-specific. In addition, rather than tunneling or transferring actual device-specific unlock codes, an algorithm that uses transfer of a user or session-specific input to generate an unlock code (e.g., a one-time use key) may be provided. Such an unlock key provides natural security benefits.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a system block diagram of an information handling system.

DETAILED DESCRIPTION

An improved method and system is disclosed for removing operating restrictions associated with a predetermined subscriber identity module (SIM) from a wireless device. In selected embodiments of the invention, a user securely logs onto a Web site that contains support information on subscription plans, billing, termination, penalties, and device-to-SIM unlocking. After satisfying any outstanding contract terms and payment of termination or device unlock fees, the user initiates a device-to-SIM unlock procedure. A client application on the wireless device securely transfers subscription, system, and SIM information to a device-to-SIM unlock system which uses the information to generate appropriate unlock codes. The unlock codes are then securely transferred to the client application, which processes them to remove operating restrictions associated with the predetermined SIM from the device and allow it to thereafter implement a plurality of SIMs.

Figure 1:
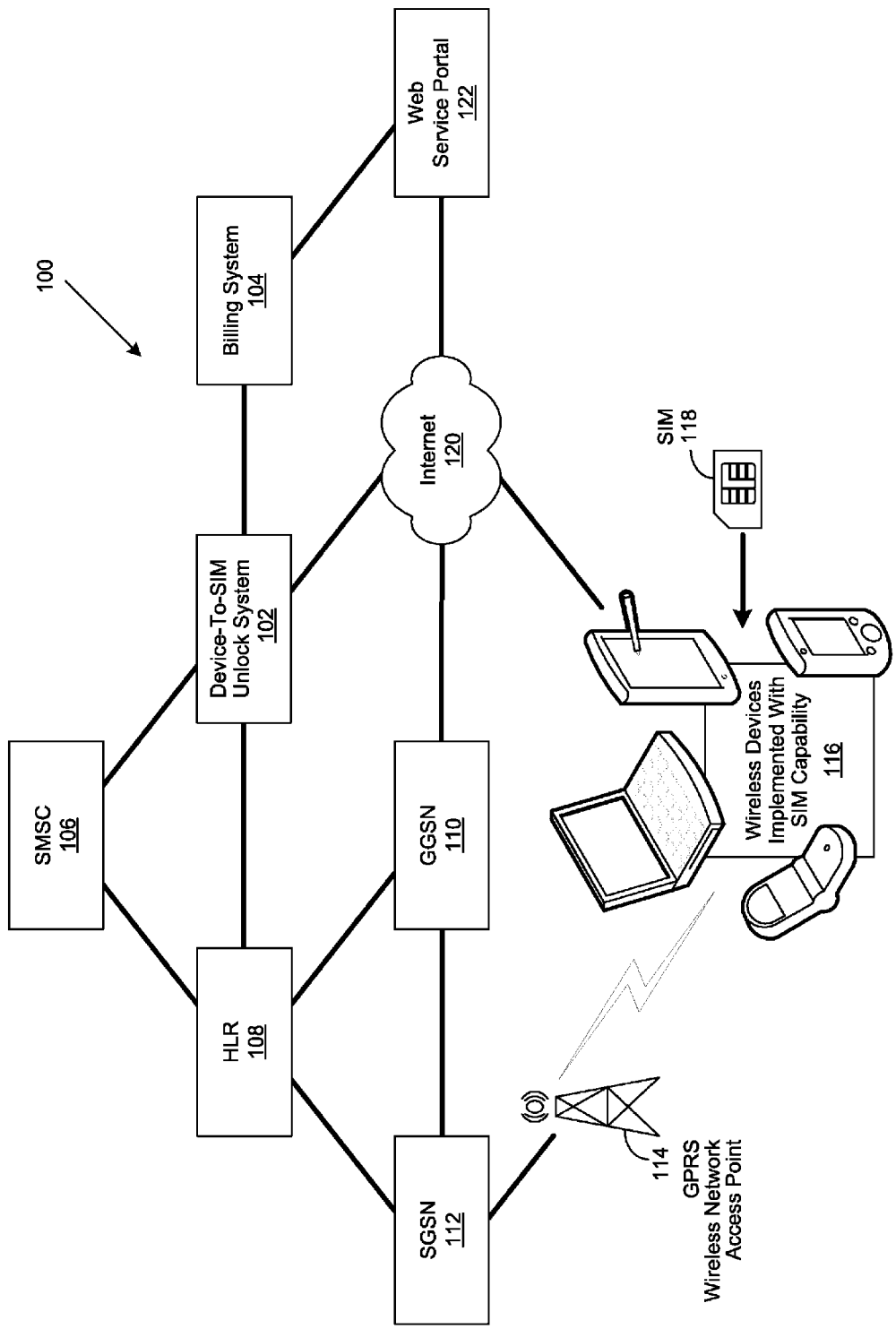
FIG. 1 shows a block diagram of a system for unlocking a device from a predetermined subscriber identity module (SIM) via a Web service portal.

Referring to FIG. 1, a block diagram of network services operating environment 100 is depicted in which a device-to-SIM unlock system 102 operates via a web service portal 122 for unlocking a wireless device 116 from a predetermined subscriber identity module (SIM) 118. More specifically, the device-to-SIM unlock system 102 interacts with wireless devices 116 comprising a SIM 118 via the Internet 120, as well as a plurality of network services operating environment modules comprising network services operating environment 100. These modules include a serving general packet radio service (GPRS) support node (SGSN) 112, a gateway GPRS support node (GGSN) 110, a home location register (HLR) 108, a short message service center (SMSC) 106, a billing system 104 and a plurality of GPRS access points 114.

The GGSN 110 supports edge routing functions for a plurality of GPRS network access points 114. To external packet data networks, such as Internet 120, the GGSN 110 performs the task of an internet protocol (IP) router as well as providing firewall and filtering functionality. The SGSN 112 tracks the location of an individual wireless device 116 and performs internetworking, access control and security functions. The HLR 108 provides routing information for mobile terminated calls and SMS messages as well as maintaining user subscription information. The SMSC 106 allows short message service (SMS) messages to be sent to and from wireless devices 116.

The device-to-SIM unlock system 102 enables unlocking of a wireless device 116 to a predetermined SIM 118 through the use of a web service portal 122 accessible through the Internet 120. The web service portal 122 provides wireless device users support information on subscription plans, account termination, billing and device-to-SIM unlocking. A subscriber is allowed to securely log onto this public website (e.g. via a username/password login using HTTPS/SSL) to settle account balances, termination penalties and any deviceto-SIM unlock fees, including the repayment of wireless device HW subsidies. After satisfying any outstanding contractual terms, the user selects and initiates a device-to-SIM unlock procedure.

Figure 2:
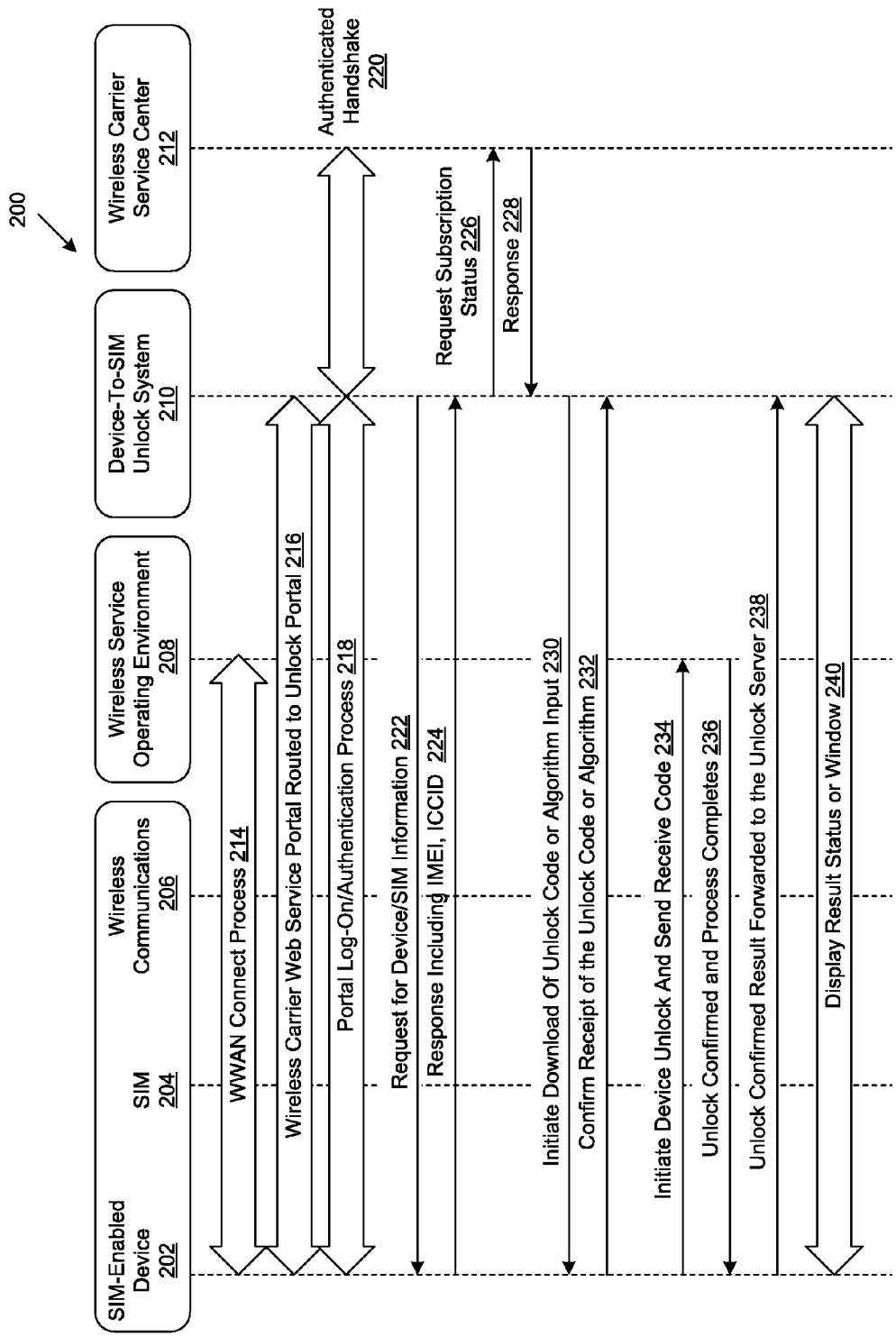
FIG. 2 shows a process diagram of the operation of the system for unlocking a device from a predetermined SIM.

FIG. 2, shows a process flow diagram of the operation of the system for unlocking a device from a predetermined subscriber identity module (SIM). In this process flow diagram, wireless wide area network (WWAN) connectivity 214 is established by SIM-enabled device 202 using information contained by SIM 204 to wirelessly couple 206 to a wireless service operating environment 208. Once connectivity is established, the wireless carrier's web service portal is accessed and the subscriber is routed 216 to a device-to-SIM unlock system 210. A secure session is established 218 with device-to-SIM unlock system 210 with authentication handshaking 220 further securing the session with the wireless carrier service center 212.

Once the secure session is established the device-to-SIM unlock system 210 requests information associated with SIM-enabled device 202 and SIM 204. The requested information, such as the IMEI for the SIM-enabled device and the ICCID for the SIM, are returned 224 to the device-to-SIM unlock system 210, which in turn, submits 226 the information to the wireless carrier service center 212 to obtain subscription status information. The wireless carrier service center 212 returns 228 the subscription status information to the device-to-SIM unlock system. If the subscription status information indicates that the SIM-enabled device 202 is eligible for unlocking, the device-to-SIM unlock system initiates 230 a download of an unlock code or algorithm to a client application implemented on SIM-enabled device 202.

Once received, confirmation of receipt is sent 232 to the device-to-SIM unlock system 210 by the client application implemented on SIM-enabled device 202. Unlocking of SIM-enabled device 202 is then initiated 234 by the client application to remove operating restrictions associated with the predetermined SIM from the device and allow it to thereafter implement a plurality of SIMs. An unlock command receive code is sent to wireless service operating environment 208, which confirms 236 receipt and the device-to-SIM unlock process is completed. Once completed, the confirmed result of the device-to-SIM unlock process is communicated 238 to the device-to-SIM unlock system by the client application implemented on SIM-enabled device 202. The results of the unlocking process are then displayed 240 to the subscriber.

Figure 3:
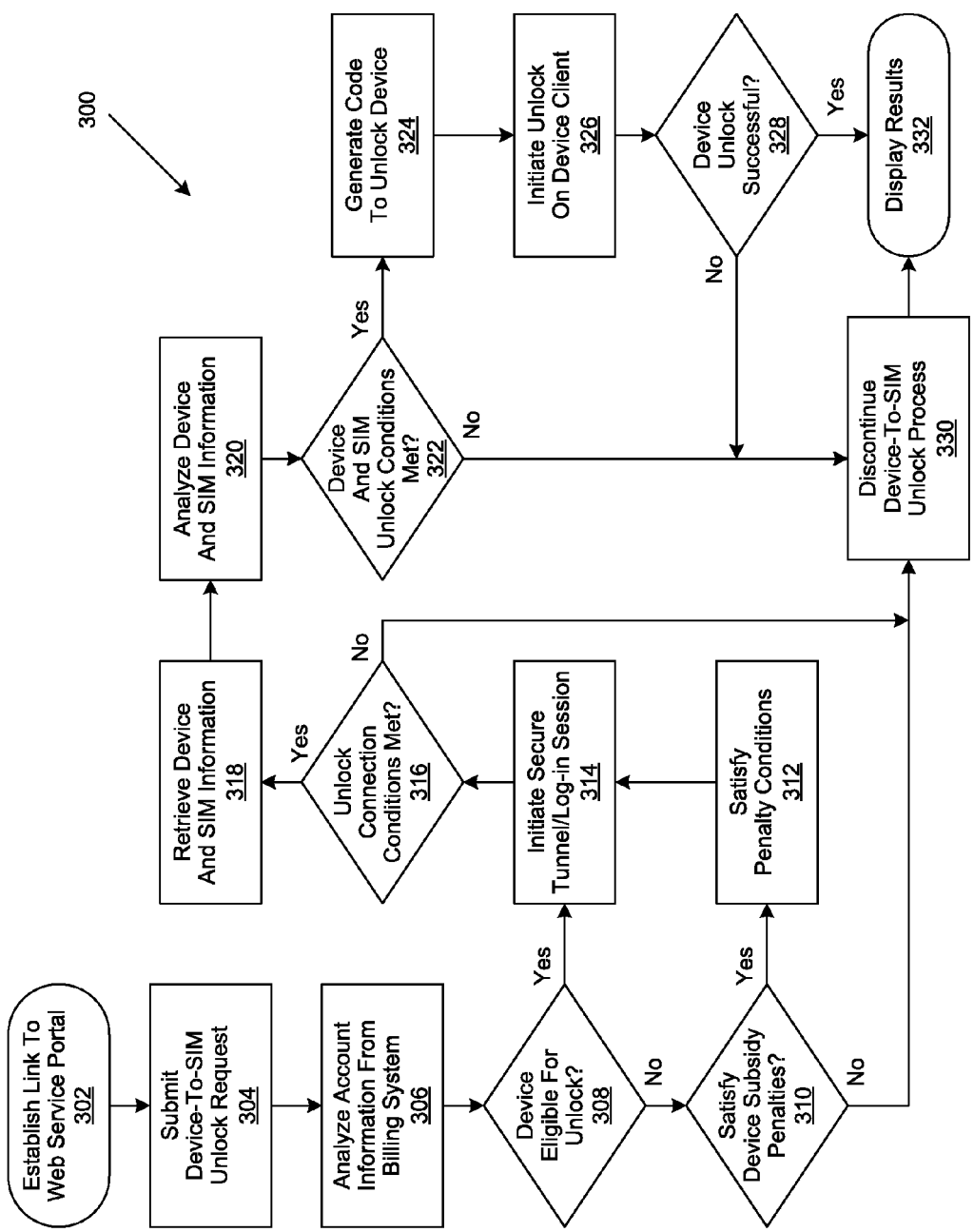
FIG. 3 shows a flow chart of the operation of the system for unlocking a device from a predetermined SIM.

FIG. 3 shows a flow chart of the operation of a device-to-SIM unlock system 300 for unlocking a device from a predetermined subscriber identity module (SIM). In step 302, a wireless subscriber establishes a connection to a web service portal, where they submit a device-to-SIM unlock request in step 314 to the carrier providing wireless service for their SIM-enabled device. In step 306, the subscriber's account information is retrieved from a billing system and analyzed to determine whether the subscriber's wireless device is eligible to be unlocked.

If it is determined in step 308 that the SIM-enabled device is not eligible to be unlocked by the service provider, the subscriber is given the option in step 310 to satisfy any associated penalties to meet the requirements for eligibility. If the subscriber decides in step 310 to not satisfy the required penalties, then the device-to-SIM unlock process is discontinued in step 330 and the results are displayed to the subscriber in step 332. Otherwise, the subscriber satisfies the penalties in step 321 and a secure communications session is initiated between the SIM-enabled device and the device-to-SIM unlock system in step 314. If it is determined in step 308 that the SIM-enabled device is eligible to be unlocked by the service provider, then a secure communications session is initiated between the SIM-enabled device and the device-to-SIM unlock system in step 314.

If a secure transport session is not successfully established upon completion of authentication handshaking in step 316, then the device-to-SIM unlock process is discontinued in step 330 and the results are displayed to the subscriber in step 332. Otherwise, predetermined subscription, system, and SIM data is securely retrieved from the SIM-enabled device and presented to the device-to-SIM unlock system in step 318. The information retrieved from the SIM-enabled device is then analyzed in step 320 to determine whether device-to-SIM unlock conditions are met. For example, the SIM-enable device may already be unlocked, or the SIM contained by the device may not have been issued by the service provider.

If device-to-SIM unlock conditions are not met in step 322, then the device-to-SIM unlock process is discontinued in step 330 and the results are displayed to the subscriber in step 332. Otherwise, based on the unlock information retrieved from the SIM-enabled device, the device-to-SIM unlock system generates an appropriate unlock codes in step 324. Once the unlock codes are generated in step 324, they are securely conveyed in step 326 to a client application implemented on the SIM-enabled device. The client application then receives, acknowledges, and processes the unlock codes via for example, a programmatic firmware interface. The client application then initiates a process to unlock the device from its associated SIM and allow it to thereafter implement a plurality of SIMs. If it is determined in step 328 that the device-to-SIM unlock process has been unsuccessful, then the device-to-SIM unlock process is discontinued in step 330 and the results are displayed to the subscriber in step 332. Otherwise, the successful results of the device-to-SIM unlock process is displayed to the subscriber in step 332.

In selected embodiments, the method can be initiated and completed via a wired Internet connection without requiring the use of a wireless connection. Additionally, instead of exploiting Internet-based communication protocols, mobile network centric communication protocols can be used can be used separately or in combination, including: TextMsg and OAA over the SMS Teleservice, and the Wireless Application Protocol (WAP). The mobile-specific Java Virtual Machine (JVM) and Qualcomm BREW application environments can also be used directly rather than a more closed client programming model. In addition, other wireless technologies may utilize similar SIM-based capabilities such as WiMax (802.16e), Wi-Fi (e.g. a WISP using EAP-SIM) and others.

Additionally, if a SIM-enabled device firmware flash update is necessary or useful to the unlocking process, then the device-to-SIM unlock process can first initiate this firmware update. Such a firmware update is beneficial to refresh the SIM-enabled device and thus make the process less carrier-specific. In addition, rather than tunneling or transferring actual device-specific unlock codes, an algorithm that uses transfer of a user or session-specific input to generate an unlock code (e.g., a one-time use key) may be provided. Such an unlock key provides natural security benefits.

Referring briefly to FIG. 4, a system block diagram of an information handling system 400 is shown. The information handling system 400 includes a processor 402, input/output (I/O) devices 404, such as a display, a keyboard, a mouse, and associated controllers, memory 412 including volatile random access memory (RAM) and non-volatile memory such as a hard disk drive, and other storage devices 406, such as a CD ROM or DVD ROM drive and other memory devices, and various other subsystems 408, all interconnected via one or more buses 414. Memory 412 comprises SIM-enabled device client 416 operable to initiate operations with device-to-SIM locking application 418. Network port 410 provides information handling system 400 connectivity to network 430, which is similarly coupled to device-to-SIM unlocking system 102. The network 430 may include the Internet 120 and be coupled to the information handling system 400 via e.g., a mobile broadband radio connection.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. Additional examples of an information handling system may be a mobile phone, camera or video recorder.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the present invention is described with respect to a GSM/GPRS network topology, it will be appreciated that similar functions and topology concepts can be applied for other types of mobile networks.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for removing restrictions from the operation of an information handling system having wireless capabilities and operating within a network services environment, comprising:
   a predetermined subscriber information module (SIM) comprising a unique electronic identifier and subscriber information, said subscriber information corresponding to said network services operating environment;
   an information handling system comprising a unique electronic identifier and operable to implement a plurality of SIMs, said information handling system restricted to implement said predetermined SIM;
   a Web service portal, comprising said network services operating environment, operable to receive and process said unique electronic identifiers and subscriber information, said Web services portal providing information handling system users support information on subscription plans, account termination, billing and information handling system-to-SIM unlocking, and;
   an information handling system-to-SIM unlock system operable to generate at least one unlock code, said unlock code operable to remove operating restrictions from said information handling system corresponding to said predetermined SIM, said information handling system-to-SIM unlock system generating said unlock code based upon processing said unique electronic identifiers via the Web service portal; and wherein
   said information handling system is operable to implement said predetermined SIM, extract unique electronic identifier and subscriber information therefrom, and establish a communications session with said network services operating environment;
   said information handling system is operable to connect with said Web service portal and submit said unique electronic identifiers and subscriber information; and,
   said Web service portal is operable to receive and process said subscriber information and electronic identifiers to determine eligibility of removing said operating restrictions from said information handling system corresponding to said predetermined SIM.

2. The system of claim 1, wherein said unique electronic identifier of said SIM comprises an international circuit card ID (ICCID).

3. The system of claim 1, wherein said subscriber information of said SIM comprises an international mobile subscriber identifier (IMSI).

4. The system of claim 1, wherein said unique electronic identifier of said information handling system comprises an international mobile equipment identifier (IMEI).

5. The system of claim 1, wherein said Web service portal is operable to approve removal of said operating restrictions, wherein said approval initiates the generation of an information handling system unlock code by the unlock system.

6. The system of claim 1, wherein said unlock system is operable to generate a predetermined unlock code, said unlock code communicated by said unlock system to said information handling system.

7. The system of claim 6, wherein said information handling system is operable to receive and process said predetermined unlock code, said unlock code operable to remove operating restrictions, said operating restriction removal allowing said information handling system to implement a plurality of SIMs.

8. A method for removing restrictions from the operation of an information handling system having wireless capabilities and operating in a network services operating environment, comprising:

provaiding a subscriber information module (SIM) comprising a unique electronic identifier and subscriber information, said subscriber information corresponding to the network services operating environment;

providing the information handling system with a unique electronic identifier operable to implement a plurality of SIMs, the information handling system being restricted to implement said SIM;

enabling receipt and processing of said unique electronic identifiers and subscriber information via a Web service portal, the Web services portal providing information handling system users support information on subscription plans, account termination, billing and information handling system-to-SIM unlocking, and;

generating at least one unlock code via an unlock system, said unlock code operable to remove operating restrictions from said information handling system corresponding to said SIM, said unlock system generating said unlock code based upon processing said unique electronic identifiers via the Web service portal; and wherein said information handling system is operable to implement said SIM, extract unique electronic identifier and subscriber information therefrom, and establish a communications session with said network services operating environment;

said information handling system is operable to connect with said Web service portal and submit said unique electronic identifiers and subscriber information; and, said Web service portal is operable to receive and process said subscriber information and electronic identifiers to determine eligibility of removing said operating restrictions from said information handling system corresponding to said SIM.

9. The method of claim 8, wherein said unique electronic identifier of said SIM comprises an international circuit card ID (ICCID).

10. The method of claim 8, wherein said subscriber information of said SIM comprises an international mobile subscriber identifier (IMSI).

11. The method of claim 8, wherein said unique electronic identifier of said information handling system comprises an international mobile equipment identifier (IMEI).

12. The method of claim 8, wherein said Web service portal is operable to approve removal of said operating restrictions, wherein said approval initiates the generation of an information handling system unlock code by the unlock system.

13. The method of claim 8, wherein said unlock system is operable to generate a predetermined unlock code, said unlock code communicated by said unlock system to said information handling system.

14. The method of claim 13, wherein said information handling system is operable to receive and process said predetermined unlock code, said unlock code operable to remove operating restrictions, said operating restriction removal allowing said information handling system to implement a plurality of SIMs.

* * * * *